United States Patent [19]

Bedford

[11] Patent Number: 4,653,853

[45] **Date of Patent: * Mar. 31, 1987**

[54] BREAKWAY REFLECTIVE SAFETY BELT

[76] Inventor: Richard T. Bedford, Rt. 2, Box 454J2, Tampa, Fla. 33610

[ * ] Notice: The portion of the term of this patent subsequent to Aug. 13, 2002 has been disclaimed.

[21] Appl. No.: 747,944

[22] Filed: Jun. 24, 1985

Related U.S. Application Data

[63] Continuation-in-part of Ser. No. 603,628, Apr. 25, 1984, Pat. No. 4,534,619.

[51] Int. Cl.[4] .......... G02B 5/12

[52] U.S. Cl. .......... 350/98

[58] Field of Search .......... 350/98, 97; 224/259; 2/308, 309, 310, 326, 338

[56] References Cited

U.S. PATENT DOCUMENTS

| | | | |
|---|---|---|---|
| 4,091,766 | 5/1978 | Colliard | 350/98 |
| 4,534,619 | 8/1985 | Bedford | 350/98 |
| 4,601,538 | 7/1986 | Valkenburg | 350/98 |

*Primary Examiner*—John K. Corbin
*Assistant Examiner*—Vincent J. Lemmo
*Attorney, Agent, or Firm*—Arthur W. Fisher, III

[57] ABSTRACT

A breakaway reflective safety belt configured to be worn on a person's torso comprising a pair of flat reflective elements, each of the pair of flat reflective elements including a first and second fastener element formed on opposite ends there of to selectively engage each other to cooperatively form a pair of loops intersecting each other to form an X shape on the back of the wearer and overlapping each other to form an X shape on the chest of the wearer such that the pair of intersecting/overlapping loops cooperatively form a pair of side openings to receive the wearer's arms and an upper opening to receive the wearer's head.

7 Claims, 4 Drawing Figures

BREAKAWAY REFLECTIVE SAFETY BELT

CO-PENDING APPLICATIONS

The present application is a continuation-in-part of patent application, Ser. No. 603,628 filed on Apr. 25, 1984 now U.S. Pat. No. 4,534,619.

BACKGROUND OF THE INVENTION

Field of the Invention

A breakaway reflective safety belt configured to be worn on a person's torso comrising a pair of loops intersecting each other to form an X shape on the back of the wearer and overlap each other to form an X shape on the chest of the wearer.

SUMMARY OF THE INVENTION

The present invention relates to a breakaway reflective safety belt configured to be worn on a person's torso comprising a pair of loops. Each loop is formed by a flat reflective element including a first and second fastener element formed on opposite ends thereof to selectively engage each other to cooperatively form each loop. The pair of loops intersect each other to form an X shape on the back of the wearer and overlap each other to form an X shape on the wearer to cooperatively form a pair of side openings to receive the wearer's arms and an upper opening to receive the wearer's head.

Each loop comprises a backing having a predetermined pattern of intersecting lines to form a visual matrix and a moisture resistant transparent reflective covering overlapping the backing.

In use, the wearer slips or places his/her arms through the side openings and head through the upper opening to place the breakaway reflective safety belt on the wearer's torso. As previously set forth, the intersection of the loops are secured together to form the X shape on the back of the wearer and overlap to form a loose fitting X shape on the wearer's chest.

Once in place, the wearer is free to move about with the breakaway reflective safety belt providing a clear visual cue to oncoming traffic.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
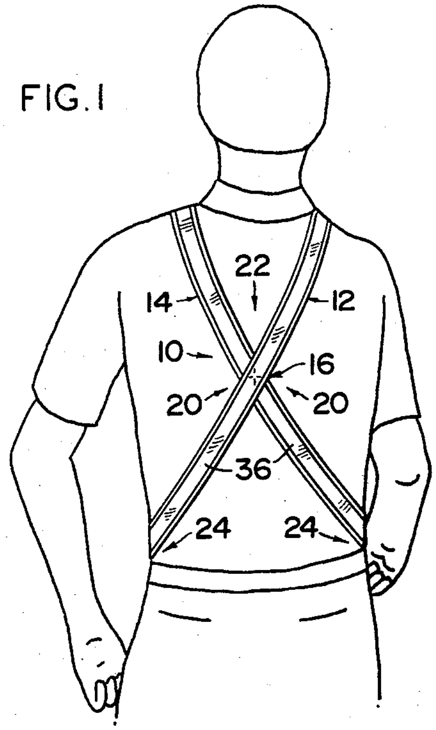
FIG. 1 is a back view of the breakaway reflective safety belt.
Figure 2:
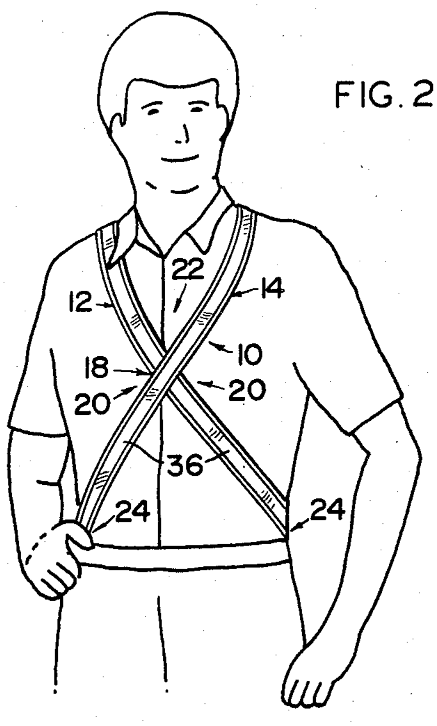
FIG. 2 is a front view of the breakaway reflective safety belt.

As shown in FIGS. 1 and 2, the present invention relates to a breakaway reflective safety belt generally indicated as 10 configured to be worn on a person's torso comprising a pair of flat reflective elements forming a pair of loops indicated as 12 and 14.

The pair of loops 12 and 14 intersect each other to form an X shape 16 on the back of the wearer and overlap each other to form an X shape 18 on the chest of the wearer. Thus the pair of intersecting/overlapping loops 12 and 14 cooperatively form a pair of side openings each indicated as 20 to receive the wearer's arms and an upper opening 22 to receive the wearer's head.

Figure 3:
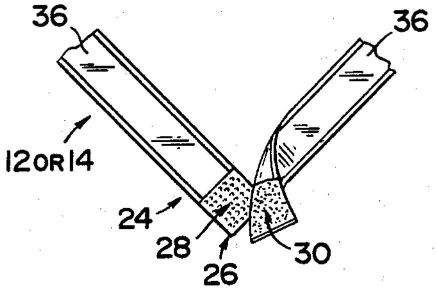
FIG. 3 is a detailed view of the lower portion of a flat reflective element and fastener elements.

The lower portion 24 of each loop 12 and 14 forms a substantially right angle 26 as best shown in FIG. 3 to rest on opposite hips of the wearer. Each of the pair of flat reflective elements includes a first and second fastener element indicated as 28 and 30 respectively on opposite ends, thereof to selectively enage each other to cooperatively form the loops 12 and 14. The first and second fastener elements 28 and 30 may comprise Velcro or other suitable means.

Figure 4:
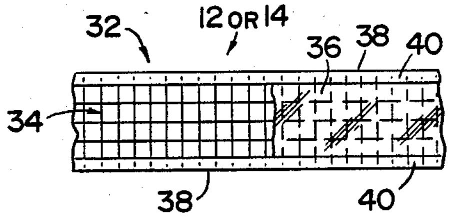
FIG. 4 is a detailed partial cross-sectional view of a flat reflective element.

As best shown in FIG. 4, each loop comprises a backing generally indicated as 32 having a predetermined pattern of intersecting lines generally indicated as 34 to form a visual matrix and a moisture resistant transparent colored reflective covering 36 overlaying the backing 32. The peripheral edges 38 on opposite sides of the backing and moisture resistant transparent colored reflective covering are secured together by a fastening border 40.

In use, the wearer slips or places his/her arms through the side openings 20 and head through the upper opening 22 to place the breakaway reflective safety belt 10 on the wearer's torso. The intersection of the loops 12 and 14 are secured together to form the X shape 16 as previously described on the back of the wearer and overlap to form a loose fitting X shape 18 on the wearer's chest. Once in place, the wearer is free to move about with the breakaway reflective safety belt 10 providing a clear visual cue to oncoming traffic. In the event either loop 12 or 14 is caught by or on a moving object (not shown) the first and second fasteners 28 and 30 will separate permitting the breakaway reflective safety belt 10 to breakaway from the wearer's torso.

It will thus be seen that the objects set forth above and those made apparent form the preceeding description are efficiently attained and since certain changes may be made in the above construction without departing from the scope of the invebtion, it is intended that all matter contained in the above description and shown in the accompanying drawings shall be interpreted as illustrative and not in a limited sense.

It is also to be understood that the following claims are intended to cover all of the generic and specific features of the invention herein described, and all statements of the scope of the invention which as a matter of language might be said to fall therebetween.

Now that the invention has been described, what is claimed is:

1. A breakaway reflective safety belt configured to be worn on a person/user consisting of a pair of flat reflective elements, each of said pair of flat reflective elements including a first and second fastener element formed on opposite ends thereof to selectively engage each other to cooperatively form a pair of loops intersecting each other on the back of the wearer and overlapping each other on the chest of the wearer such that said intersecting/overlapping loops cooperatively form a pair of side openings to receive the wearer's arms and an upper opening to receive the wearer's head.

2. The breakaway reflective safety belt of claim 1 wherein said intersection on the back of the wearer forms a substantially X shape and the overlapping of said loops on the chest of the wearer forms a substantially X shape.

3. The breakaway reflective safety belt of claim 2 wherein the lower portion of each said loop forms a substantially right angle to rest on opposite hips of the wearer.

4. The breakaway reflective safety belt of claim 1 wherein each said loop comprises a backing having a predetermined pattern of intersecting lines to form a reflective matrix thereon.

5. The breakaway reflective safety belt of claim 4 wherein each said loop comprises a moisture resistant colored reflective covering overlapping said reflective backing.

6. The breakaway reflective safety belt of claim 4 wherein the peripheral edges of said reflective backing and said moisture resistant covering are secured together by a fastening border extending along opposite peripheral edges thereof.

7. The breakaway reflective safety belt of claim 4 wherein each said loop further includes a moisture resistant covering overlaying said backing.

* * * * *